United States Patent [19]

Hinz et al.

[11] Patent Number: 5,137,779
[45] Date of Patent: Aug. 11, 1992

[54] GLASS-CERAMIC ARTICLE DECORATED WITH CERAMIC COLOR

[75] Inventors: Paul Hinz, Mainz-Finthen; Helmut Dislich, Budenheim; Herwig Scheidler, Mainz-Finthen; Gerhard Weber, Schornsheim, all of Fed. Rep. of Germany

[73] Assignee: Schott Glaswerke, Mainz, Fed. Rep. of Germany

[21] Appl. No.: 607,878

[22] Filed: Nov. 5, 1990

[30] Foreign Application Priority Data

Nov. 3, 1989 [DE] Fed. Rep. of Germany ....... 3936654

[51] Int. Cl.$^5$ .................. B32B 17/06; B32B 15/00; B32B 9/00; B32B 18/00
[52] U.S. Cl. .................... 428/336; 428/428; 428/426; 428/689; 428/701; 428/901; 428/210; 156/89
[58] Field of Search ................ 428/701, 702, 697, 49, 428/428, 266, 689, 336, 446, 210, 325, 384, 901, 426; 156/89; 126/39 J, 39 D, 39 R; 220/458; 206/524.1, 524.6

[56] References Cited

U.S. PATENT DOCUMENTS

| 186,112 | 1/1877 | Cliff et al. ........................ 156/89 |
|---|---|---|
| 1,334,301 | 4/1920 | Hasburg ........................... 428/210 |
| 2,566,735 | 9/1951 | Lepie .............................. 156/89 |
| 3,681,132 | 6/1970 | Pammer et al. .................... 428/446 |
| 4,043,824 | 8/1977 | Wagar ............................ 428/324 |
| 4,074,010 | 2/1978 | Knight ........................... 428/446 |
| 4,200,468 | 5/1980 | Hurley, Jr. ...................... 428/325 |
| 4,340,645 | 7/1982 | O'Conor .......................... 428/428 |
| 4,341,841 | 7/1982 | Ohno et al. ...................... 428/446 |
| 4,401,709 | 8/1983 | Prabhu et al. .................... 428/210 |
| 4,415,624 | 11/1983 | Prabhu et al. .................... 428/901 |
| 4,690,855 | 9/1987 | Inokuti et al. ................... 428/901 |
| 4,781,970 | 11/1988 | Barbee et al. .................... 428/426 |
| 4,929,493 | 5/1990 | Tünker ........................... 428/210 |
| 5,021,287 | 6/1991 | Otagiri et al. ................... 428/901 |

OTHER PUBLICATIONS

*Glass: Science and Technology,* vol. 1, Glass–Forming Systems, edited by Uhlmann et al., Academic Press, p. 404 (1983).
*Chemistry of Glasses,* 2nd Edition, A. Paul, Chapman and Hall, p. 41 (1990).

Primary Examiner—Ellis P. Robinson
Assistant Examiner—Frank Rosenberg
Attorney, Agent, or Firm—Millen, White & Zelano

[57] ABSTRACT

The invention is related to a glass-ceramic article decorated with a ceramic baking finish. A $SiO_2$ layer, about 20–200 nm thick, is placed between the decoration and the glass-ceramic material. The $SiO_2$ layer can additionally contain, to match the refractive index to the refractive index of the glass-ceramic, up to 66.5 wt % of oxides which change the refractive index, in particular $TiO_2$, $ZrO_2$, $SnO_2$, MgO or $Al_2O_3$. In the process to produce the decorated glass ceramic article, the $SiO_2$ layer is preferably produced according to the known sol-gel process. Preferably, an $SiO_2$ gel layer, optionally precondensed by a brief thermal treatment, is produced on the still-vitreous article. The decoration is applied to this gel layer and afterward the vitreous article is subjected to ceramization. The $SiO_2$-gel layer is converted into an $SiO_2$ layer, and the ceramic color of the decoration is baked-in. The $SiO_2$ layer permits, above all, the production of substantially "halo"-free decorations with sharp contours.

8 Claims, No Drawings ns, prior to decorating, a layer of $SiO_2$ or of silica gel thermally convertible into $SiO_2$ is applied to said article.

GLASS-CERAMIC ARTICLE DECORATED WITH CERAMIC COLOR

BACKGROUND OF THE INVENTION

Glass-ceramic articles have many applications, e.g., as refractory kitchen dishes resistant to thermal shock and especially also as cooking surfaces for kitchen ranges. These articles are generally provided with decorations (e.g., colored designs), whether it be for purely optical reasons or, e.g., to delineate the cooking locations on cooking surfaces. Ceramic colors based on porcelain enamel are used as colors for the decorations.

Ceramic colors lay on the surface of the article. They generally comprise a binder, typically a glass of suitable melting point, and coloring pigments, typically oxides. The glass used as the binder can also be colored.

The ceramic colors generally are in the form of a powder which is dispersed in a disperant to form a paste. Ceramic colors are applied according to conventional techniques such as, e.g., screen printing or by the transfer picture technique (decals), and are then baked-in.

As in known, glass-ceramics are produced from a ceramizable glass by a thermal treatment according to a certain temperature-time program (ceramization). Temperatures up to about 1,000° C. are reached during such a program.

For reasons relating to production, and conservation of energy, baking of the decorative colors is preferably performed at the same time as ceramization, although the ceramization temperatures are unusually high compared with the usual baking temperatures.

As in known, there are numerous glass-ceramics. These glass-ceramics can have quite different chemical compositions and different conversion mechanisms. It is evident to one skilled in the art that, due to the high baking temperature during the ceramization, inter alia, for many colors defects or problems can occur.

These include defects in the decorative color applied to the glass-ceramic, defects to the ceramizable glass in the form of undesired shades, insufficient adhesiveness or thermal cycling stability of the decoration, excessive roughness and the resultant problems of cleaning associate therewith, insufficient stability toward alkalis (cleansing agents) or toward acids (e.g., citric acid), as well as running, unsharp shapes (halo formation) of the decoration. Several of such defects can occur simultaneously.

SUMMARY OF THE INVENTION

An object of the invention, therefore, is to provide a glass-ceramic article decorated with ceramic color, in particular a glass-ceramic plate, as well as a process for the production of such an article, wherein the defects described above are largely avoided.

Upon further study of the specification and appended claims, further objects and advantages of this invention will become apparent to those skilled in the art.

These objects are achieved by a glass-ceramic article having a ceramic color, applied to the surface thereof, comprising an $SiO_2$ layer positioned between said ceramic color layer and said glass-ceramic substrate.

According to a process aspect of the invention there is provided a process for the production of a glass-ceramic article decorated with ceramic color, comprising:

decorating an article made of glass which can be ceramized with a ceramic color, and baking-in said ceramic color during ceramization, wherein, prior to decorating, a layer of $SiO_2$ or of silica gel thermally convertible into $SiO_2$ is applied to said article.

The $SiO_2$ layer is to be thin enough that it does not noticeably influence the properties of the glass-ceramic. It has turned out that layer thicknesses of about 20–200 nm normally fulfill all requirements and are thus preferred. If the layer thickness drops below about 20 nm, in some cases the desired effect may fail to occur. On the other hand, if a layer thickness of about 200 nm is exceeded, the layer may become chipped. Especially suitable layer thicknesses are about 60–80 nm, because they fulfill the protective function to a sufficient extent.

Layers of pure $SiO_2$ are more or less easily visible, depending on the difference in the refractive index of $SiO_2$ and glass ceramic. This effect can be desireable to achieve special optical effects.

However, if this effect is undesired and it is important that the $SiO_2$ layer remain invisible. This can be achieved by incorporating, into the $SiO_2$ layer, oxides which will change the refractive index. Metal oxides suitably for changing the refractive index include, e.g., $TiO_2$, $ZrO_2$, $SnO_2$, $MgO$, and $Al_2O_3$. These oxides are included in the $SiO_2$ layer in amounts such that the refractive index of the $SiO_2$ layer corresponds to the desired value, i.e., generally approaches or equals that of glass ceramic. The amount of the oxides present in the $SiO_2$ layer for changing the refractive index can be up to 66.5 wt. %, relative to the total oxide content of the $SiO_2$ layer. In the glass-ceramic types common today, additions of up to about 50 wt. %, in particular of up to about 15 wt. %, of oxides for changing the refractive index are generally sufficient.

Especially suitable as an oxide for changing the refractive index is $TiO_2$, which preferably is contained in amounts of about 7–15 wt. %, in particular about 11 wt. %, within the $SiO_2$ layer.

The refractive index $(n_d)$ of the $SiO_2$ layer is generally about 1.46. The refractive index of glass-ceramic on the other hand, is generally about 1.54. Thus, the oxides added to the $SiO_2$ layer will typically increase the refractive index, such as the oxides mentioned above.

In cases where lowering of the refractive index of quartz-glass is desired, this can be accomplished by, e.g., introducing F into the quartz-glass.

Thus, in accordance with the invention, where the $SiO_2$ layer is mentioned, it also includes the embodiment of an $SiO_2$ layer which contains oxides capable of changing the refractive index.

Deposition of the $SiO_2$ layer before application of the decoration can be performed according to any suitable process, e.g., by vacuum evaporation, sputtering, printing or by suitable CVD (chemical vapor deposition) processes.

Production of the $SiO_2$ layer by the known sol-gel process is especially favorable. The sol-gel process is explicitly described, e.g., for flat glass, in *Sol-Gel Technology for Thin Films, Fibers, Preforms, Electronics and Specialty Shapes*, Chapter 4: Thin films from the Sol-Gen Process, edited by Lisa C. Klein, Noyes Publications 1988, pages 50–79.

In the sol-gel process, a thin layer of one or more silicic acid esters is applied to the surface of the object to be coated. This layer hydrolyzes in air into a gel that can be dried (condensed) by brief heating to the extent that it can be stored for weeks and can be provided with the decoration.

The silicic acid esters generally are used in the form of a suitable solution, e.g., in ethanol, and the solution further also contains the metal oxides, in the form of their alkoxides or other hydrolyzable compounds, that are employed to change the refractive index. Alcohols suitable for the esterification and alkoxide formation, as well as suitable as solvents, are in particular methanol, ethanol, n- and 1-propanol and the butanols. Ethanol is preferred as solvent because it is nonpoisonous, but other solvents also can be used so long as the esters or alkoxides are soluble therein.

Dilution of the esters by the solvent makes it easier to adjust the desired layer thickness of the subsequent $SiO_2$ layer. The suitable concentration of esters in the solvent can be easily determined by a few routine tests. Generally the concentration is about 1–30 wt. %, calculated as oxide. Besides the esters, portions of partially or completely hydrolyzed esters in sol form can also be present in the solvent without disrupting the process.

The solution containing the esters is applied on the article to be ceramized before decoration, i.e., before application of the ceramic color and before ceramization. Application can be performed by dipping the article in the solution. All other current coating techniques can also be used such as spraying, flow coating, centrifugal coating, etc. After coating, if necessary, a possible excess of solution is removed and the esters are hydrolyzed. If the thickness of the $SiO_2$ layer able is not sufficiently achieved by a single coating, other coating operations can follow the hydrolysis until the desired layer thickness is achieved.

The hydrolysis of the esters occurs in air automatically at the same time as the evaporation of the solvent. However, it can also be accelerated by artificial humidification of the air. After hydrolysis, the gel layer formed on the article is still relatively soft, so that a storage or a decoration of coated articles can be performed only with suitable precautionary measures against scratching, etc. But, the gel layer can be cured (dried) by gentle heating to assure that the coated articles will have a high abrasion resistance and a months-long shelf life. This curing is based on a polycondensation of the silicic acid and represents an intermediate step before final conversion of the layer into $SiO_2$, which is performed at high temperatures at the same time as the ceramization step. The temperatures sufficient for this curing can be about 50° C. and 500° C. Generally they are within the range of about 100° C.–200° C. Satisfactory curing of the $SiO_2$ layer is generally achieved in less than about 10 minutes.

It is especially advantageous if the coating of the article, e.g., by spraying, is performed at a point during the course of production at which the article still has a high enough temperature that the solvent can evaporate and the $SiO_2$-gel layer can cure from the residual heat stored in the article. In this way, a separate heating of the coated article to cure the layer can be dispensed with. Whether this advantageous procedure is used or whether the heating is performed in a separate step depends on the respective production conditions. Because of the good shelf life of the cured layer, the application of the layer and its final conversion into the $SiO_2$ layer can be separated in time, which represents an important production engineering advantage.

After decoration, the still vitreous article is ceramized in a way known in the art by a thermal treatment according to a predetermined temperature-time curve. Depending on the type of glass-ceramic, temperatures of about 900° C.–1,100° C. are reached. During the temperature treatment, conversion of the $SiO_2$-gel layer, applied according to the sol-gel process and optionally precured, into the vitreous $SiO_2$ layer is performed and simultaneously the decorative color is baked-in. For a discussion of thermal treatment in producing glass-ceramics, see, e.g., Schott Glaslexikon, MVG - Verlag Landsberg, 1986, (ISBN 3-478-05243-2).

The advantages that can be achieved with the invention, above all, lie in the practically complete avoidance of running contours in the decoration, so-called "halos." Thus, it is possible to use a considerably greater range of ceramic colors than was previously possible. Other significant functional properties of the finished glass-ceramic, such as chemical resistance or abrasion resistance, are generally positively influenced. No degradation of these properties was able to be established.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding German application P 39 36 654.5-45, filed Nov. 3, 1989, are hereby incorporated by reference.

EXAMPLES

In the following example, an embodiment of the invention employing a $SiO_2$ layer produced according to the sol-gel process is described.

EXAMPLE 1

A still vitreous, 4 mm-thick plate of unceramized glass with a composition, in wt. %, of: $SiO_2$ 64; $Al_2O_3$ 21.3; $Li_2O$ 3.5; $Na_2O$ 0.6; $K_2O$ 0.5; $BaO$ 2.5; $CaO$ 0.2; $MgO$ 0.1; $ZnO$ 1.5; $TiO_2$ 2.3; $ZrO_2$ 1.6; $MnO_2$ 0.65; $Fe_2O_3$ 0.23; $CoO$ 0.37; $NiO$ 0.06; and $Sb_2O_3$ 0.85, was dipped in a 2 wt. % (calculated as metal oxide) solution of 89 wt. % of $SiO_2$ in the form of $Si(OC_2H_5)_4$ and 11 wt. % of $TiO_2$ in the form of $Ti(OC_2H_5)_4$ (to match the refractive index) in ethanol. After the dipping and draining, the plate was thermally treated in a kiln for 4 minutes at 170° C. After cooling, the plate was decorated with a commercially available ceramic color based on lead borate (yellow RAL number 8008-3) using a screen printing process.

After the color dried, the plate was converted in a ceramization kiln into glass-ceramic, during which a maximum temperature of 920° C. occurred. The formation of the $SiO_2$-$TiO_2$ layer and the baking-in of the ceramic color occurred at the same time as the ceramization.

The ceramic color or the applied decorative pattern showed, after cooling of the plate now converted into glass-ceramic, a sharp contour. The remaining functional properties of the plate continued to be good. The thickness of the $SiO_2$-$TiO_2$ layer was 65 nm.

EXAMPLES 2-7

Example 1 was repeated with the modification that solutions of different compositions were used for coating:

| No. 2 | 100 wt. % | $SiO_2$ | (as $Si(OC_2H_5)_4$) |
|---|---|---|---|
| No. 3 | 80 wt. % | $SiO_2$ | 20 wt. % $ZrO_2$ (as $Zr(i-OC_3H_7)_4$) |
| No. 4 | 50 wt. % | $SiO_2$ | 50 wt. % $ZrO_2$ (as $Zr(i-OC_3H_7)_4$) |
| No. 5 | 66.5 wt. % | $SiO_2$ | 33.5 wt. % $SnO_2$ (as $SnCl_4$) |
| No. 6 | 50 wt. % | $SiO_2$ | 50 wt. % $SnO_2$ (as $SnCl_4$) |
| No. 7 | 33.5 wt. % | $SiO_2$ | 66.5 wt. % $SnO_2$ (as $SnCl_4$) |

The quality of the baked decorative pattern in each case corresponded to that of example 1.

COMPARATIVE EXAMPLE A

Example 1 was repeated with the exception that the application of the layer was omitted. After cooling, the decorative pattern showed blurry contours.

EXAMPLE 8

To a still vitreous, 4 mm-thick plate of unceramized glass according to example 1, a 2 wt. % (calculated as metal oxide) solution of 85 wt. % $SiO_2$ (as $Si(OC_2H_5)_4$) and 15 wt. % $TiO_2$ (as $Ti(OC_2H_5)_4$) was applied by an atomizing nozzle in three work steps with intermediate evaporation of the solvent and simultaneous hydrolysis of the esters. Afterwards, the plate was thermally treated in a kiln for 4 minutes at 200° C., and a curing of the layer by polycondensation occurred. The decoration of the plate and the ceramization were performed according to example 1. The layer thickness of the $SiO_2/TiO_2$ layer was 150 nm. The quality of the reproduction of the decoration was unchanged compared to example 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A glass-ceramic article having a decorative ceramic color applied to the surface thereof comprising:
    a glass-ceramic substrate;
    a ceramic color layer; and
    an $SiO_2$ layer having a thickness of about 20-200 nm positioned between said ceramic color layer and said glass-ceramic substrate.

2. A glass-ceramic article according to claim 1, wherein said substrate is a glass-ceramic plate.

3. A glass-ceramic article according to claim 1, wherein the thickness of said $SiO_2$ layer is about 60-80 nm.

4. A glass-ceramic article according to claim 1, wherein the said $SiO_2$ layer contains up to about 66.5 wt. % of oxides which affect refractive index.

5. A glass-ceramic article according to claim 4, wherein said $SiO_2$ layer contains, as oxides which affect refractive index, $TiO_2$, $ZrO_2$, $SnO_2$, $Al_2O_3$, MgO or mixtures thereof.

6. A glass-ceramic article according to claim 1, wherein the said $SiO_2$ layer contains up to about 15 wt. % of oxides which affect refractive index.

7. A glass-ceramic article according to claim 6, wherein said $SiO_2$ layer contains, as oxides which affect refractive index, $TiO_2$, $ZrO_2$, $SnO_2$, $Al_2O_3$, MgO or mixtures thereof.

8. A glass-ceramic article according to claim 1, wherein said $SiO_2$ layer contains about 7-15 wt. % $TiO_2$.

* * * * *